United States Patent [19]

Pezzolo

[11] Patent Number: 4,588,926
[45] Date of Patent: May 13, 1986

[54] ANTI-FLICKER CIRCUIT FOR AUTOMATIC TURN-ON OF NIGHTLIGHT

[75] Inventor: Donald E. Pezzolo, Cupertino, Calif.

[73] Assignee: Intermatic Incorporated, Spring Grove, Ill.

[21] Appl. No.: 522,911

[22] Filed: Aug. 12, 1983

[51] Int. Cl.[4] .......................................... H05B 37/02
[52] U.S. Cl. .................................... 315/155; 315/156; 315/159
[58] Field of Search ............... 315/156, 151, 159, 155, 315/149

[56] References Cited

U.S. PATENT DOCUMENTS 3,450,939  6/1969  Misencik ............................ 315/156
4,207,501  6/1980  Smallegan ....................... 315/156 X Primary Examiner—David K. Moore
Attorney, Agent, or Firm—Alan H. MacPherson; Steven F. Caserza; Richard Franklin

[57] ABSTRACT

A second photoelectric element or cell (P2) is mounted in series with a first photoelectric element or cell (P1) of the prior art and in parallel with a portion of a voltage divider of which said first element is a part to shunt out a portion of the divider in response to light from a light load turned on by the operation of said first element incident to an increase in impedance thereof due to ambient darkness. Addition of the second photoelectric cell results in hysteresis of the turn-on/turn-off operating points of the first cell to prevent flicker to the light which is present at or near dusk in lights controlled by the prior art circuits. Mechanically, one cell (P1) is mounted on the side of a collar (21) surrounding the neck of a light bulb (13) outside direct light rays from the filament (23) while cell (P2) is mounted on the collar top in the direct path of light rays from the filament.

6 Claims, 4 Drawing Figures

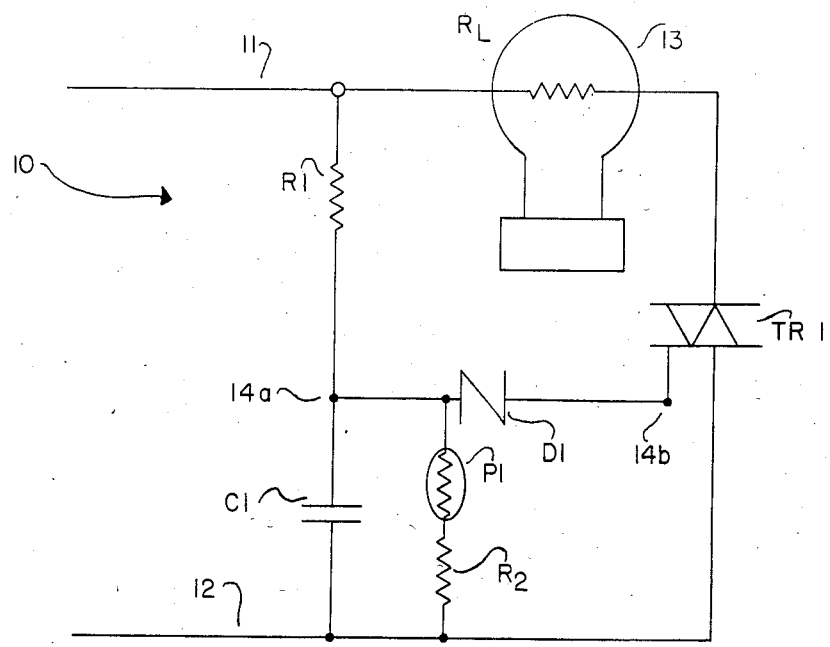
FIG. 1 (PRIOR ART)
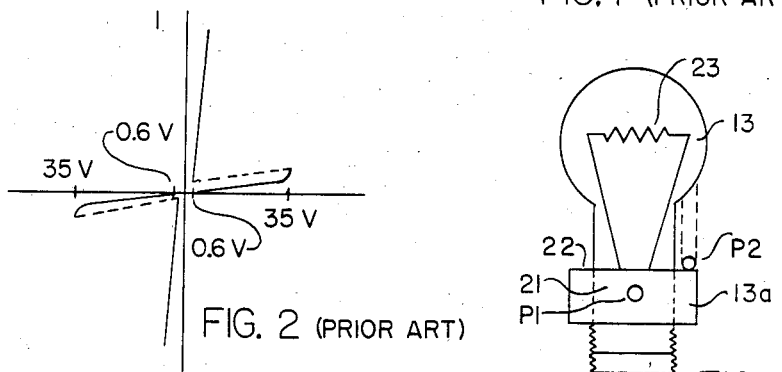
FIG. 2 (PRIOR ART)
FIG. 4
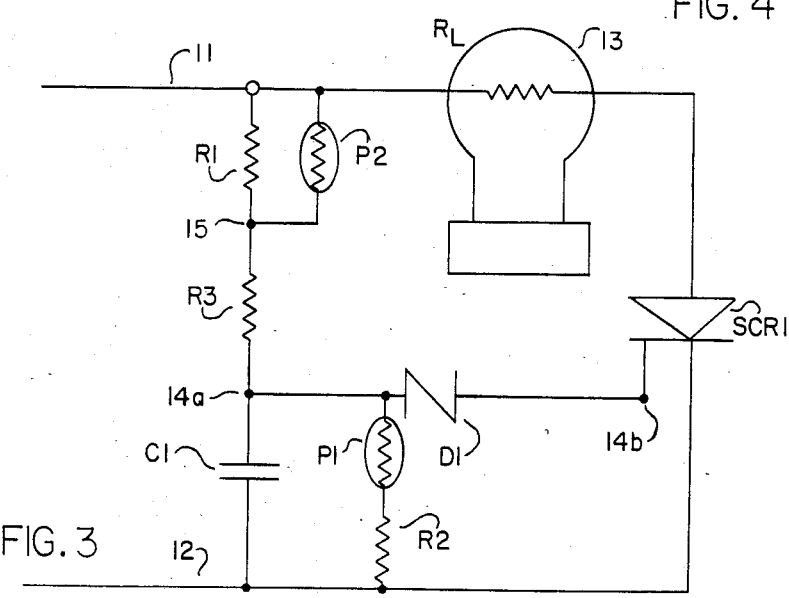
FIG. 3

ANTI-FLICKER CIRCUIT FOR AUTOMATIC TURN-ON OF NIGHTLIGHT

FIELD OF THE INVENTION

This invention relates to circuits for automatically turning on lights in response to darkness; and in particular, to a circuit for turning on lights which avoids the flicker associated with the automatic turn-on circuitry of the prior art.

PRIOR ART

The automatic turn-on of lights is commonly employed to illuminate areas where people are not available at the fall of darkness to turn on lights. Typically, such lights are turned on by a circuit of the type shown in FIG. 1. In FIG. 1 the line voltage is applied on leads 11 and 12 to a light $R_L$. During daylight hours, triac TR1 (in some embodiments an SCR is used instead of a triac) connected in series with the load impedance $R_L$ of the light is off. The power supply signal is applied on lead 11 and passes through a voltage divider made up of resistor R1 (typically about 120K ohms) in series with photoresistive element P1 connected in parallel with capacitor C1. In series with photoresistive element P1 is resistor R2, typically having a resistance of 27k ohms. Connected between node 14a and node 14b is a four-layer diode D1 having a voltage vs. current characteristic of the type shown in FIG. 2.

The current through R1 charges capacitor C1. During daylight hours, the typical impedance of photoresistive element P1 (also called a "photoelectric eye") is somewhere in the range of 200-1000 ohms. Accordingly, the voltage across capacitor C1 never becomes greater than the turn-on voltage of four-layer diode D1. Diode D1, a well-known device, requires in one embodiment 35 volts from anode to cathode before it turns on. When it turns on its impedance drops to a forward biased condition of about 0.6 volts. Capacitor C1 then discharges through diode D1 driving the gate connected to node 14b to triac TR1.

During the daylight hours P1 has an impedance of about 300 ohms and insufficient voltage accumulates across capacitor C1 to turn on bilateral diode D1. Thus triac TR1 is not triggered and no current is conducted through the load $R_L$ of the incandescent bulb.

When dusk falls, photoelectric eye P1 senses the ambient darkness and increases its impedance. The range of impedance presented by the photoelectric eye varies from about 200 to 1000 ohms during daylight to several megohms in absolute darkness. Accordingly, at some point in dusk the impedance of P1 becomes sufficient to insure that the voltage across capacitor C1 is adequate to turn on bilateral diode D1. When bilateral diode D1 turns on, thereby providing a current to the gate of triac TR1, triac TR1 turns on. Thus current is drawn through the bulb impedance $R_L$ turning on the bulb 13. However, due to reflections, the light from the bulb 13 strikes photoelectric eye P1 thereby reducing its impedance. Accordingly, the charge on capacitor C1, which was discharged through bilateral diode D1 thereby to provide the gate current for triac TR1, becomes insufficient to allow capacitor C1 to build up a voltage sufficient to discharge through diode D1 during the next half cycle of the power supply signal. The result is that light bulb 13 flickers on and off until it gets sufficiently dark that the reflections from light 13 are insufficient to reduce the impedance of photoelectric cell P1 so as to cause flicker.

SUMMARY OF THE INVENTION

This invention overcomes the flicker of prior art automatic turn-on circuits using a photoelectric eye. In accordance with this invention, flicker is prevented by mounting a second photoelectric eye in series with the first photoelectric eye but in parallel with a portion of the voltage divider of which the first electric eye is a part thereby to shunt out this portion of the voltage divider in response to the light turning on.

This invention will more fully understood in light of the following detailed description taken together with the attached drawings.

DESCRIPTION OF THE DRAWINGS

FIG. 1 shows an automatic turn-on circuit of the prior art;

FIG. 2 shows the voltage vs. current plot of the bilateral diode D1 typically used in the automatic turn-on circuit of the prior art;

FIG. 3 illustrates the automatic turn-on circuit of this invention; and

FIG. 4 is a side view of lamp 13 mounted in the package of the overall device showing the preferred position of the photocells P1 and P2.

DETAILED DESCRIPTION

The circuit of this invention is shown in FIG. 3. In FIG. 3 the elements which correspond to the elements of the prior art circuit are given the identical numbers as in FIG. 1. However, the elements added in accordance with this invention are given new numbers. Thus, the circuitry of FIG. 1 during daylight hours works exactly as described above. However, as dusk falls, the impedance of photoelectric cell P1 increases. When the impedance of photoelectric cell P1 increases sufficiently to allow capacitor C1 to provide a sufficient voltage to turn on bilateral diode D1 and thus provide a gate drive current to silicon controlled rectifier SCR1, light bulb 13 turns on. The turning on of light 13 activates photoelectric cell P2 connected from line 11 to node 15 in parallel with impedance R1 (in the structure of FIG. 3 typically 150K ohms). The light striking photoelectric cell P2 immediately lowers the impedance of cell P2 to several hundred ohms thereby effectively shunting out the resistor R1. Resistor R3 (typically 110k ohms) is connected in series with R1 for preventing or insuring that during normal daylight the photocell P2 does not form with photocell P1 a voltage divider such that the voltage at node 14a is sufficient to turn on diode D1 and thus turn on silicon controlled rectifier SCR1.

In order for the light bulb 13 to turn off, the impedance introduced into the circuit by photoresistive cell P1 must drop an extra amount representative of the value of the impedance of resistor R1. Thus the addition of photocell P2 results in a hysteresis of the turn-on/turn-off operating points of photocell P1. As long as the value of this hysteresis is greater than the reflection of light from bulb 13 to photocell P1, the circuit will not exhibit flicker.

An alternative way of looking at the operation of the circuit is to realize that photocell P1 is physically mounted to strongly sense ambient light and weakly sense the radiant energy from bulb 13 while photocell P2 is physically mounted to strongly sense the radiant energy produced by light bulb 13. Thus when light 13 turns on, photocell P2 strongly senses the radiant energy from the light and thereby reduces the impedance of the parallel combination of R1 and P2 thus lowering the value of the impedance of photocell P1 at which light 13 turns off. Because photocell P1 is weakly coupled to the energy from light 13, the impedance of photocell P1 remains sufficiently high to prevent flicker. During the turning off of light 13 at dawn, the impedance of photocell P2 rises due to the shutting off of light 13 while the impedance of photocell P1 drops due to the increase in ambient light. Thus the ratio of the impedance of R1 in parallel with photocell P2 and in series with R3 to the impedance of photocell P1 becomes sufficiently high that flicker on and off of light 13 is eliminated when light 13 turns off at dawn.

The construction of the device (FIG. 4) includes means for maximizing the light coupling of photocell P2 to light 13 and for minimizing the reflection of light 13 to photocell P1. Photocell P1 is thus preferably attached to a side vertical surface 21 of a collar 13a surrounding the neck of light bulb 13, outside of the direct rays of light from the light filament 23. Photocell P2 is placed on the top surface 22 of the collar where direct light rays from the filament 23 may strike. Collar 13a has an internal diameter and height of sufficient size so that it can be slipped over the contact threads of the bulb and surround the neck of bulb 13. The other circuit components may also be confined on a PC board (not shown) within an annular hollow interior of collar 13a. Power to operate the circuits is drawn from contact with the bulb screw threads and socket into which the bulb is screwed. The collar shields element P1 from direct light rays from filament 23. Ring-like collar 13a may be circular or square in horizontal cross-section.

When the prior art structures turned off at dawn, they also exhibited flicker for the very reasons discussed above; but the circuitry and construction of this invention again avoids this flicker.

The above description of this invention is intended to be illustrative and not limiting. Other embodiments of this invention will be obvious to those skilled in the art in view of the above disclosure.

I claim:

1. In an automatic light turn-on circuit including a lighting load having a fixed impedance, an electronic switch including a gate electrode for receiving a gating current for turning on said switch, a voltage divider comprising a first resistor in series with a first photosensitive element connected in parallel to a capacitor, a diode connected in series between said element and said gate electrode of said electronic switch wherein during daylight hours the element has a relatively low impedance resulting in insufficient voltage developing across the capacitor to turn on said diode and trigger said electronic switch to turn on said lighting load, said element at dusk having sufficient impedance to insure sufficient voltage across said capacitor to turn on said diode, said electronic switch and said lighting load, the improvement comprising means for preventing flicker of said lighting load at dusk and dawn by light from said lighting load striking said element, said means comprising:

a second photosensitive element disposed to strongly sense radiant energy from said lighting load and electrically connected in parallel with at least a portion of said first resistor and effective, when light from said lighting load strikes said second photosensitive element, to shunt out said portion of said first resistor thereby to raise the voltage across said capacitor.

2. The invention of claim 1 further including resistor means connected in series with said first resistor for preventing during daylight hours sufficient voltage developing across said capacitor to turn on said diode, said electronic switch and said lighting load.

3. The invention of claim 1 wherein said second photosensitive element is exposed to a higher incidence of light from said lighting load than said first photosensitive element.

4. The invention of claim 3 including means for shielding said first photosensitive element from direct rays of light from said lighting load and means for exposing said second photosensitive element to direct rays of light from said lighting load.

5. The invention of claim 4 wherein said lighting load is a filament-containing necked light bulb and wherein said means for shielding includes a collar surrounding the neck of said bulb, said first photosensitive element being positioned on a side of said collar not facing said filament and said second photosensitive element being positioned on a portion of said collar facing said filament.

6. A circuit for automatically turning on a light at nightfall and for automatically turning off the light at dawn, comprising:

resistive means;

a first photoresistor connected in series with said resistive means between a supply voltage terminal and a reference voltage terminal;

capacitive means connected in parallel with said first photoresistor for developing a voltage representative of the impedance of said first photoresistor;

switching means responsive to the voltage developed by said capacitive means, said switching means being connected in series with said light between said supply voltage terminal and said reference voltage terminal; and a second photoresistor disposed to strongly sense radiant energy from said light and electrically connected in parallel with at least a portion of said resistive means, said second photoresistor being adapted to shunt out at least a portion of said resistive means when said light is turned on thereby to prevent any rays of said light which strike said first photoresistor from causing said light to flicker on and off.

* * * * *